(12) United States Patent
Kato (10) Patent No.: US 8,338,023 B2
(45) Date of Patent: Dec. 25, 2012

(54) AA ALKALINE BATTERY

(75) Inventor: Susumu Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 754 days.

(21) Appl. No.: 12/124,803

(22) Filed: May 21, 2008

(65) Prior Publication Data

US 2009/0317711 A1 Dec. 24, 2009

(30) Foreign Application Priority Data

Dec. 26, 2007 (JP) ................................. 2007-334365

(51) Int. Cl.
*H01M 2/02* (2006.01)
(52) U.S. Cl. ........................................................ 429/164
(58) Field of Classification Search .................... 429/164
See application file for complete search history.

(56) References Cited

U.S. PATENT DOCUMENTS

| | | | | |
|---|---|---|---|---|
| 2002/0090549 | A1* | 7/2002 | Urade et al. ................. | 429/174 |
| 2004/0009394 | A1 | 1/2004 | Ito et al. | |
| 2005/0227145 | A1* | 10/2005 | Iwamoto et al. ............. | 429/224 |

FOREIGN PATENT DOCUMENTS

| | | |
|---|---|---|
| JP | 05-089861 | 4/1993 |
| JP | 09-035719 | 2/1997 |
| JP | 11-149927 | 6/1999 |
| JP | 2000-306575 | 11/2000 |
| JP | 2002-151017 | 5/2002 |
| JP | 2002-532851 | 10/2002 |
| JP | 2003-017043 | 1/2003 |
| JP | 2004-146294 | 5/2004 |
| JP | 2005-100732 | 4/2005 |
| JP | 2005100732 A * | 4/2005 |
| JP | 2005-322613 | 11/2005 |
| JP | 2007-207766 | 8/2007 |
| WO | WO 00/36667 | 6/2000 |

OTHER PUBLICATIONS

Japanese Notice of Reasons for Rejection, w/ English translation thereof, issued in Japanese Patent Application No. JP 2007-334365 dated May 18, 2010.

* cited by examiner

*Primary Examiner* — Ula C Ruddock
*Assistant Examiner* — Daniel Gatewood
(74) *Attorney, Agent, or Firm* — McDermott Will & Emery LLP (57) ABSTRACT

A positive electrode and a negative electrode are accommodated in a bottomed cylindrical battery case with a separator interposed therebetween, and an opening part of the battery case is sealed by means of a gasket. A body part of the battery case has a thickness in the range between 0.1 and 0.17 mm. The positive electrode is made of a material obtained by adding graphite to manganese dioxide. The density of the graphite in the material of the positive electrode is in the range between 0.12 and 0.23 g/cm$^3$.

14 Claims, 3 Drawing Sheets

AA ALKALINE BATTERY

BACKGROUND OF THE INVENTION

AA alkaline batteries are widely used as main power sources for everyday items, toys, tools for hobbies, video game machines, potable mobile electronic equipment, and the like and are therefore desired to have long lifetime in using these tools.

It is necessary for elongating the driving period of tools to increase the discharge capacities of the batteries, which requires an increase in content of manganese dioxide as a positive electrode active material in the positive electrode. For increasing the content of manganese dioxide relative to a given volume, the content of graphite added as a conductive material (approximately 10% content in usual) must be reduced relatively.

However, graphite has a function as a binder for increasing the moldability of the positive electrode mixture in addition to a function of increasing the conductivity. Accordingly, reduction in content of graphite leads to loss of the conductivity and the moldability of the positive electrode.

For tackling this problem, various techniques for increasing the discharge capacity by increasing the content of manganese dioxide with the conductivity and the moldability of the positive electrode maintained are known, such as a technique in which the conventionally-used graphite is replaced by expanded graphite (see Japanese Unexamined Patent Application Publication 9-35719 and Japanese Unexamined Patent Application Publication 11-149927, for example), a technique in which the water content or the molding compressed density of the positive electrode mixture is optimized (see Japanese Unexamined Patent Application Publication 2000-306575, for example), and the like.

On the other hand, other countermeasures are provided in view of the fact that there is limit in increasing the content of manganese dioxide relative to a given volume. Namely, the discharge capacity is increased by increasing the outer diameter of the battery within the range provided in JIS to increase the volume of the battery while reducing the thickness of the battery case (see Japanese Unexamined Patent Application Translation of PCT Application) No. 2002-532851, for example).

For increasing the discharge capacity of an alkaline battery, it is effective to increase the internal volume by reducing the thickness of the battery case. Reduction in thickness of the battery case, however, lowers the crimping strength at the sealing part of the battery case to invite leakage of the electrolyte from the sealing part. Against this problem, a countermeasure has been taken in which the thickness of the opening part of the battery case is made thicker than that of the body part thereof (see Japanese Unexamined Patent Application Publication 2002-151017 and Japanese Unexamined Patent Application Publication 5-089861, for example).

SUMMARY OF THE INVENTION

The inventor examined a way to increase the capacity of an alkaline battery using a battery case thinned in view of the foregoing to find the following problems.

Namely, when AA alkaline batteries prepared so as to have a dimension (14.3 mm, for example) around the maximum outer diameter (14.5 mm) provided in JIS were fitted to a battery accommodating part of equipment for use and were allowed to discharge under a given load until the batteries reach a predetermined voltage (0.9 V, for example), the inventor noticed that some batteries could not be detached smoothly from the battery accommodating part after discharge.

The inventor examined the cause thereof to find that the outer diameters of the batteries after discharge became larger than those before discharge (typically, approximately 0.1 mm increase). This might be caused due to the following phenomenon.

Figure 4:
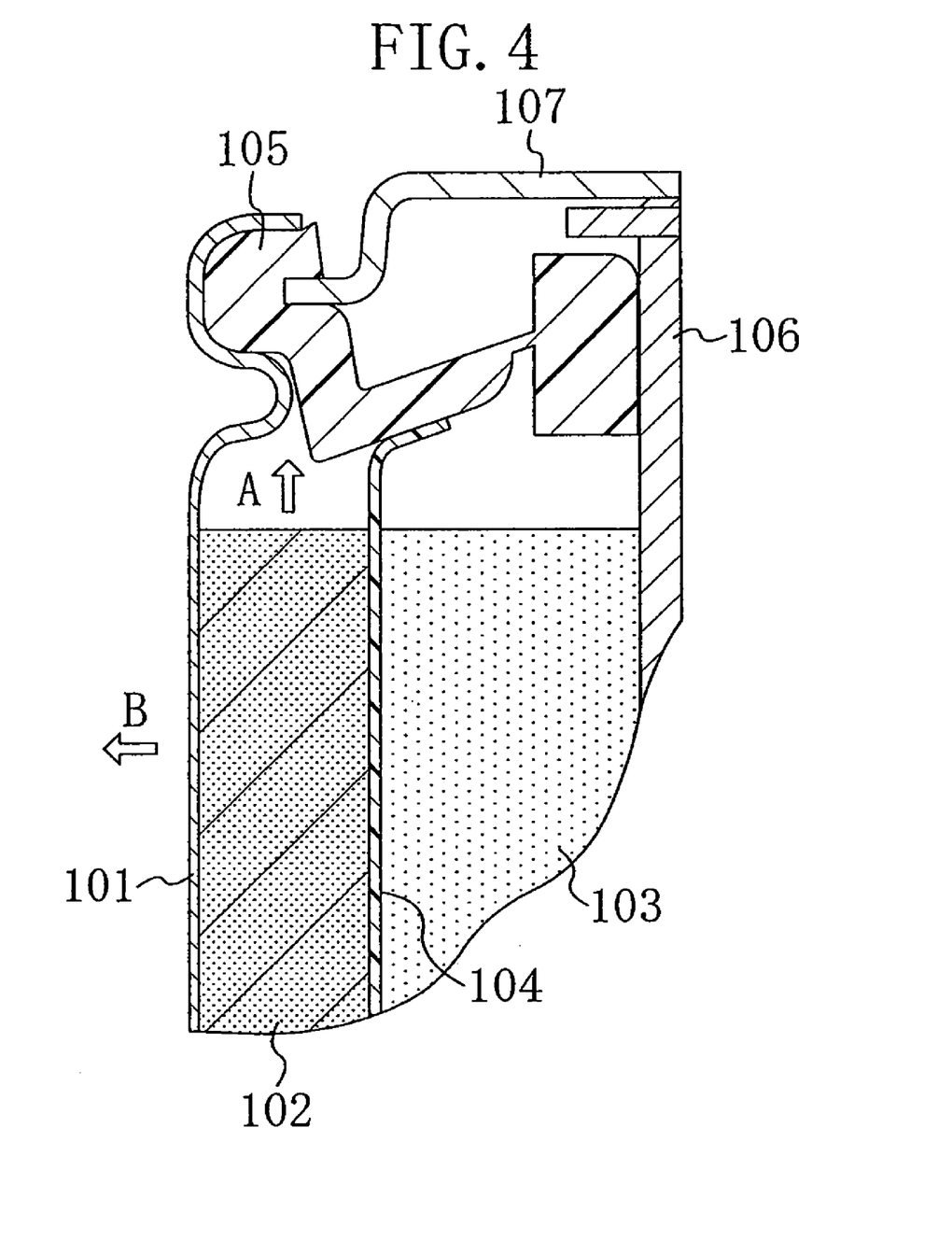
FIG. 4 is a partial sectional view showing a construction of the vicinity of an opening part of an alkaline battery for explaining problems in the present invention.

FIG. 4 is a sectional view showing a general construction of the vicinity of a sealing part in an alkaline battery, wherein a positive electrode 102 and a negative electrode 103 are accommodated in a battery case 101 with a separator 104 interposed therebetween, and the opening part of the battery case 101 is sealed by means of a gasket 105.

It is known that the positive electrode of which active material is manganese dioxide is expanded through a discharge reaction. The positive electrode 102 is expanded in the direction indicated through an arrow A in FIG. 4 because the side face of the positive electrode 102 is pushed by the battery case 101 while the upper part (on the sealing part side) of the positive electrode 102 is opened, as shown in FIG. 4. Meanwhile, the reduction in thickness of the body part of the battery case 101 reduces the force of pushing the side face of the positive electrode 102 to allow the positive electrode 102 to expand also in the direction indicated by an arrow B in FIG. 4 (the radial direction of the battery). For this reason, the batteries having the battery case 101 of which body part is thinned might have increased its outer diameter after discharge.

Japanese Unexamined Patent Application Publication 2002-151017 states at the paragraph [0003] that a due facto standard of the outer diameter of an AA alkaline battery is 14.0±0.1 mm. The inventor examined matching between a battery accommodating part of equipment driven by an AA battery as a power source and the AA battery to find that not so few batteries having outer diameters exceeding approximately 14.35 mm cannot be fitted into the equipment smoothly. In other words, it was found that a battery having the maximum diameter (14.5 mm) provided in JIS is impractical.

The present invention has been made in view of the foregoing and has its object of providing a high-capacity alkaline battery including a battery case of which body part is thinned which can be smoothly detached from a battery accommodating part of equipment by suppressing an increase in outer diameter of the battery after discharge.

To attain the above object, the present invention provides an AA alkaline battery including a battery case of which body part has a thickness in the range between 0.1 and 0.17 mm, wherein the density of graphite in a material of a positive electrode made of manganese dioxide is set in the range between 0.12 and 0.23 g/cm$^3$.

Specifically, an AA alkaline battery in accordance with the present invention includes: a bottomed cylindrical battery case including a body part and an opening part sealed by means of a gasket; and a positive electrode and a negative electrode accommodated in the battery case with a separator interposed therebetween, wherein the body part of the battery case has a thickness in a range between 0.1 and 0.17 mm, and the positive electrode is made of a material obtained by adding graphite to manganese dioxide, a density of the graphite in the material of the positive electrode being in a range between 0.12 and 0.23 g/cm$^3$.

The predetermined amount of graphite added to the material of the positive electrode has releasability and detachability to allow the stress in the positive electrode forming body caused due to expansion of manganese dioxide to disperse, thereby releasing the strain in the positive electrode forming body toward the open side. Thus, an increase in outer diameter of the battery after discharge can be suppressed.

Wherein, the density of the graphite is preferably in a range between 0.16 and 0.20 g/cm$^3$. This attains a high-capacity positive electrode mixture excellent in moldability.

In a preferred embodiment, the thickness of the body part of the battery case is smaller than that of the opening part of the battery case. More preferably, the thickness of the body part of the battery case is 15% or more smaller than that of the opening part of the battery case.

In a preferred embodiment, the AA alkaline battery has an outer diameter in a range between 14.1 and 14.3 mm. Further, the body part of the battery case has an outer diameter in a range between 13.95 and 14.15 mm. With these arrangements, the battery after discharge, which has further high capacity, can be detached smoothly from the battery accommodating part of equipment for use, thereby leading to provision of a more practical battery.

In a preferred embodiment, the positive electrode, which is in a hollowed cylindrical shape, and the negative electrode, which is gelled and filled in a hollowed part of the positive electrode, are disposed in the battery case with the separator, which is in a bottomed cylindrical shape, interposed therebetween, and a ratio ($T_1/T_2$) of a thickness ($T_1$) in a radial direction of the positive electrode to a thickness ($T_2$) in a radial direction of the negative electrode is in a range between 0.63 and 0.72. This attains an AA alkaline battery capable of high-rate discharge.

In a preferred embodiment, the positive electrode, which is in a hollowed cylindrical shape, and the negative electrode, which is gelled and filled in a hollowed part of the positive electrode, are disposed in the battery case with the separator, which is in a bottomed cylindrical shape, interposed therebetween, and a ratio ($T_1/T_2$) of a thickness ($T_1$) in a radial direction of the positive electrode to a thickness ($T_2$) in a radial direction of the negative electrode is in a range between 0.67 and 0.77. This attains an AA alkaline battery capable of low-rate discharge.

In a preferable embodiment, the manganese dioxide has a volume average particle size in a range between 30 and 50 μm and includes 8% or lower particles of which particle size is equal to or smaller than 5 μm or 5% or lower particles of which particle size is equal to or smaller than 100 μm.

In a preferred embodiment, an electrolyte is filled in the battery case, the electrolyte being made of an aqueous solution containing potassium hydroxide at a concentration in a range between 30 and 36%, more preferably, between 30 and 34%.

In a preferred embodiment, the positive electrode, which is in a hollowed cylindrical shape, and the negative electrode, which is gelled and filled in a hollowed part of the positive electrode, are disposed in the battery case with the separator, which is in a bottomed cylindrical shape, interposed therebetween, and a distance in a radial direction between the positive electrode and the negative electrode is in a range between 0.26 and 0.60 mm.

According to the present invention, a high-capacity alkaline battery including a battery case of which body part is thinned can be realized of which detachment from a battery accommodating part is made smooth by suppressing an increase in outer diameter of the battery after discharge.

DETAILED DESCRIPTION OF THE INVENTION

Embodiments of the present invention will be described below with reference to the accompanying drawings. In the below-mentioned drawings, the same reference numerals are assigned to components having substantially the same functions for the sake of simple explanation. It is noted that the present invention is not limited to the following embodiments.

Embodiment 1

Figure 1:
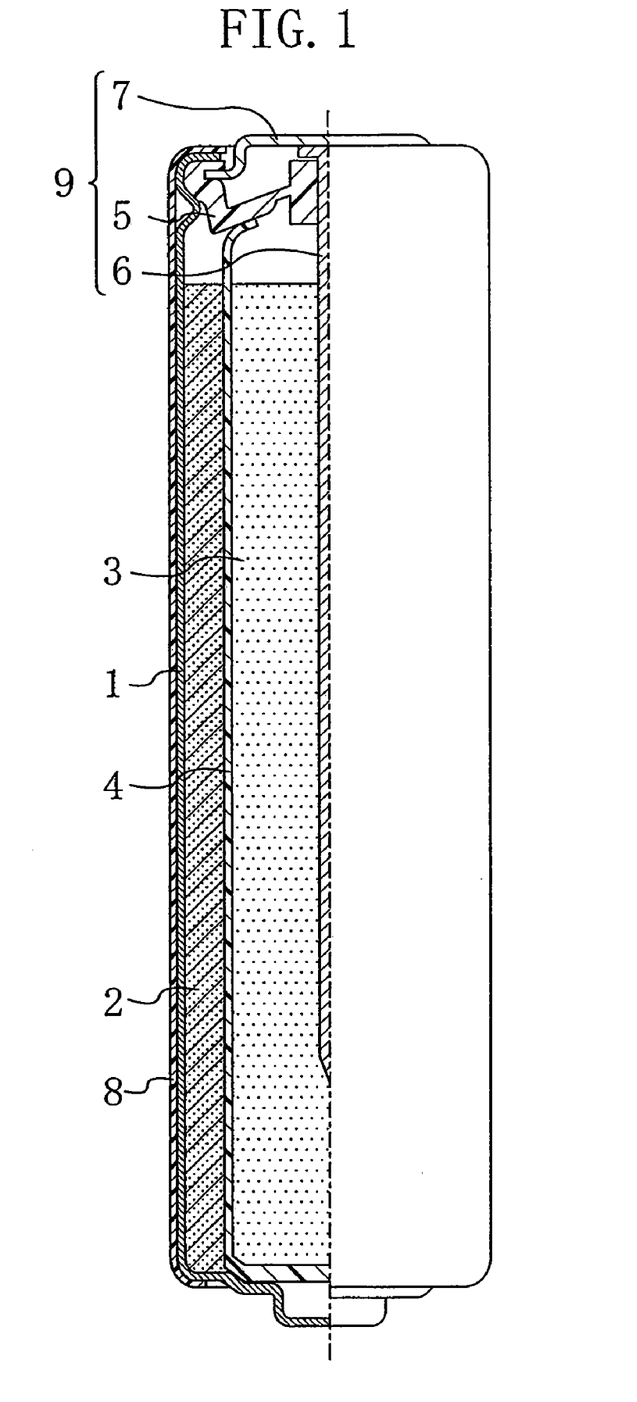
FIG. 1 is a semi-sectional view showing a construction of an alkaline battery in accordance with the present invention.
Figure 2:
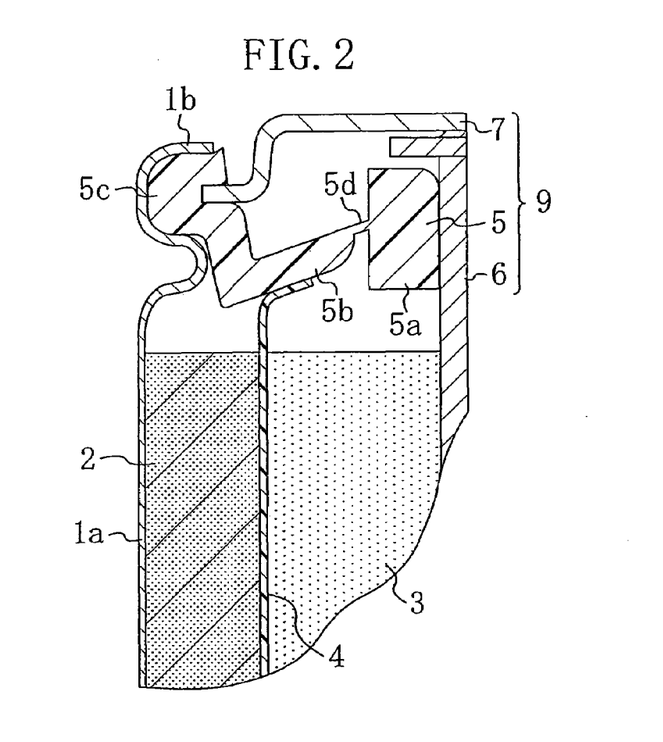
FIG. 2 is a partial sectional view showing a construction of the vicinity of an opening part of the alkaline battery in accordance with the present invention.

FIG. 1 is a semi-sectional view showing a construction of an alkaline battery in accordance with Embodiment 1 of the present invention. FIG. 2 is a partial sectional view showing a construction of the vicinity of an opening part of the alkaline battery.

As shown in FIG. 1, a positive electrode 2 and a gelled negative electrode 3 are accommodated in a bottomed cylindrical battery case 1 with a separator 4 interposed therebetween, and the opening of the battery case 1 is sealed by means of a gasket 5 and a negative electrode terminal plate 7. Further, as shown in FIG. 2, the thickness of a body part 1a of the battery case 1 is set smaller than that of an opening part 1b thereof.

The body part 1a of the battery case has a thickness in the range between 0.1 and 0.17 mm, which can increase the discharge capacity of the battery. The positive electrode 2 is made of a material obtained by adding at least graphite to manganese dioxide, wherein the density of the graphite in the material of the positive electrode is in the range between 0.12 and 0.23 g/cm$^3$. With this arrangement, expansion of the positive electrode 2 by discharge is released toward the open side (the sealing part side) of the positive electrode 2 to suppress an increase in outer diameter of the battery after discharge. Hence, even when the battery, which has an outer diameter nearly equal to the maximum outer diameter provided in JIS, is fitted to a battery accommodating part of equipment for use, the battery after discharge can be detached from the battery accommodating part smoothly.

Herein, it is preferable to set the outer diameter of the alkaline battery to be in the range between 14.1 and 14.3 mm. Further, it is preferable to set the outer diameter of the body part 1a of the battery case to be in the range between 13.95 and 14.15 mm. Setting thereof attains smooth detachment of the battery after discharge, which is made to have a high capacity by employing a larger battery case, from the battery accommodating part of equipment for use. Hence, the battery becomes further practical.

The predetermined amount of graphite added to the positive electrode material has releasability and detachability to disperse the stress in the positive electrode forming body caused by expansion of manganese dioxide, thereby releasing the strain in the positive electrode forming body toward the open side. Accordingly, an increase in outer diameter of the battery after discharge might be suppressed.

Herein, the kind, the particle size, and the like of graphite added to manganese dioxide are not limited specifically, but high-purity artificial graphite having an average particle size in the range between 10 and 25 μm is preferable because it brings the positive electrode to have excellent moldability. Natural graphite or expanded graphite in a scaly shape of the same size may be employed.

The crystal structure, the particle size, and the like of manganese dioxide is not limited specifically, and any manganese dioxide of beta type, gamma type, lambda type, delta type, and epsilon type may be employed. Further, in addition to manganese dioxide, oxy nickel hydroxide, silver oxide, copper oxide, or the like may be contained as a positive electrode active material. To the positive electrode mixture, there may be added carbon black, carbon fiber, or the like as a conductive material, polyethylene powder or the like as a binder, and stearate or the like as a lubricant.

The graphite used in the present invention exhibits, when the density of the graphite contained in the positive electrode material falls in the predetermined range, an effect of dispersing the stress in the positive electrode forming body by expansion of manganese dioxide. In view of the moldability of the positive electrode and the discharge capacity, it is preferable to set the graphite density in the range between 0.16 and 0.20 $g/cm^3$. Graphite at a density of $0.16$ $g/cm^3$ or smaller lowers the moldability of the positive electrode mixture while graphite at a density of $0.20$ $g/cm^3$ or greater reduces the relative content of the positive electrode material (manganese dioxide) to lower the discharge capacity.

The present invention is to solve the problem arisen where the body part $1a$ of the battery case 1 is thinned, namely, to suppress an increase in outer diameter of the battery after discharge. In order to prevent lowering of the crimping strength of the opening part of the battery case 1, however, it is preferable to set the thickness of the opening part $1b$ of the battery case 1 greater than that of the body part $1a$ thereof. In doing so, it is preferable to set the thickness of the body part $1a$ of the battery case 1 to be 15% or more smaller than that of the opening part $1b$ thereof.

Modified Example 1 of Embodiment 1

In order to attain the object of the present invention, the density of graphite in the positive electrode material must be set in the range between 0.12 and 0.23 $g/cm^3$, which sets a limit in increasing the discharge capacity by increasing the loading weight of the positive electrode active material (manganese dioxide).

The alkaline battery shown in FIG. 1 is in a generally-called inside out structure in which the positive electrode 2 formed in a hollowed cylindrical shape and the gelled negative electrode 3 are accommodated in the battery casing 1 with the separator 4 interposed therebetween. In contrast, there is a battery in a generally-called spiral structure in which a positive electrode and a negative electrode in sheet like shapes are wound with a separator interposed therebetween and are accommodated in a battery case.

In general, the electrodes of batteries in the inside out structure are thicker than those of batteries in the spiral structure, and therefore, the discharge characteristics of the batteries in the inside out structure differ significantly according to the electric resistance and the polarization characteristics of the electrodes even if the loading weights of the positive electrode active materials are the same.

With the foregoing taken into consideration, the present inventor examined a condition under which optimum discharge characteristics can be obtained in view of the facts that: the electric resistance of the positive electrode is larger by about three orders than that of the negative electrode; and as to the polarity characteristics, the potential of the negative electrode is almost constant while that of the positive electrode gradually lowers within the practical range. Specifically, the thickness ranges of the positive electrode and the negative electrode were examined which are suitable in high-rate discharge characteristics or low-rate discharged characteristics under a condition that the density of the graphite in the positive electrode material is kept in a range that invites no increase in outer diameter of the battery after discharge.

As a result of the above examination, it was found that the ratio ($T_1/T_2$) of the thickness ($T_1$) in the radial direction of the positive electrode to that ($T_2$) of the negative electrode in the range between 0.63 and 0.72 brings excellent high-rate discharge characteristics while that in the range between 0.67 and 0.77 brings excellent low-rate discharge characteristics.

Specifically, since a positive electrode having a greater thickness increases the electric resistance and worsens the polarization characteristics, the upper limit of $T_1/T_2$ in the high-rate discharge is preferably lower than that in the low-rate discharge. The lower limit of $T_1/T_2$ depends on a thickness of the positive electrode required for securing the loading weight of the positive electrode active material.

On the other hand, the low-rate discharge receives less influence of the electric resistance of the positive electrode, and accordingly, the lower limit of $T_1/T_2$ therein can be set higher than that in the high-rate discharge. The upper limit of $T_1/T_2$ depends on a thickness of the negative electrode required for securing the loading weight of the negative electrode active material.

Herein, the "high-rate discharge" means discharge that satisfies the condition adhering to IEC, namely, discharge characteristics that the number of cycles accumulated until it reaches 1.05 V exceeds 130 where pulse discharge in which a cycle of discharge at 0.5 W for two seconds and discharge at 0.65 W for 28 seconds is repeated is repeated ten cycles per one hour under an environment of 20±2° C.

The "low-rate discharge" means that satisfies a condition adhering to IEC, namely, discharge characteristics that a discharge duration accumulated until it reaches 0.9 V exceeds 100 hours where a cycle of discharge for four hours a day with a load of 43Ω applied is repeated everyday under an environment of 20±2° C.

Any discharges satisfying a discharge characteristic condition, which is not the same as but substantially equivalent to that adhering to IEC are included in the "high-rate discharge" or the "low-rate discharge" in the present invention.

Modified Example 2 of Embodiment 1

The present inventor further examined a condition under which optimum discharge characteristics can be obtained in view of the fact that the electric resistance and the polarization of the positive electrode depend on the particle size of manganese dioxide.

As a result of the examination, it was found that excellent discharge characteristics can be obtained when the volume average particle size of manganese dioxide is in the range between 30 and 50 μm and the content of particles thereof having a particle size of 5 μm or smaller is 8% or lower or the content of particles thereof having a particle size of 100 μm or larger is 5% or lower.

Manganese dioxide with a small particle size does not come into contact with graphite in the positive electrode and is liable to cohere as a single element to serve as a factor of an increase in electric resistance. Therefore, it is preferable that the rate of manganese dioxide with a small particle size is low. In addition, in the discharge reaction of manganese dioxide, proton received at the surface of manganese dioxide from water is reduced from tetrad to triad to be diffused inside the particles, thereby homogenizing the manganese dioxide. Accordingly, the diffused proton hardly reaches the inside of the particles of manganese dioxide with a larger particle size to worsen the polarization characteristics. Hence, it is preferable to set the rate of manganese dioxide having a larger particle size low.

Furthermore, manganese dioxide having a volume average particle size in the range between 30 and 50 μm brings excellent moldability of the positive electrode.

Embodiment 2

In order to increase the discharge capacity of a battery, Embodiment 1 employs means for reducing the thickness of the body part of the battery case. However, there is a limit in increasing the thickness of the body part in view of necessity of maintaining the strength of the battery case.

To tackle this problem, the inventor adopted an approach to an increase in discharge capacity of a battery through an increase in volume of the battery by reducing the volume occupied by the sealing part of the battery case.

Specifically, the volume occupied by a sealing unit 9 composed of the gasket 5, a negative electrode current collector 6, and the negative electrode terminal plate 7 was reduced by reducing the thickness of the gasket 5 and the length of a center cylinder part 5a of the gasket 5.

In the batteries having such a construction, however, a phenomenon of leakage was observed in non-discharging batteries and overdischarging batteries.

The causes thereof might be a shortened period until leakage occurs due to electrolyte creeping (a creeping phenomenon of an alkaline electrolyte), which is caused due to a shortened distance between the gasket and the positive electrode or the negative electrode, and acceleration of aged degradation of the thinned part of the gasket by hydrolysis of the alkaline electrolyte in the case where the gasket is made of polyamide resin.

In addition, when the battery overdischarges, the potential of the positive electrode lowers. When it lowers to be equal to or lower than the hydrogen overvoltage, hydrogen is generated to invite leakage.

The inventors focused on the fact that the progresses of these phenomena depend on the concentration of potassium hydroxide (KOH) used as an electrolyte.

Specifically, creeping, which is an electric capillary action, depends on difference in concentration of hydroxide ion (OH—) between the inside and the outside of a battery. The higher the concentration of KOH is, the more readily the creeping of the alkaline electrolyte progresses.

Further, water supply is easy in the alkaline electrolyte in which OH— is present. Accordingly, the lower the KOH concentration is, the more readily hydrolysis progresses in the alkaline electrolyte made of polyamide resin.

Figure 3:
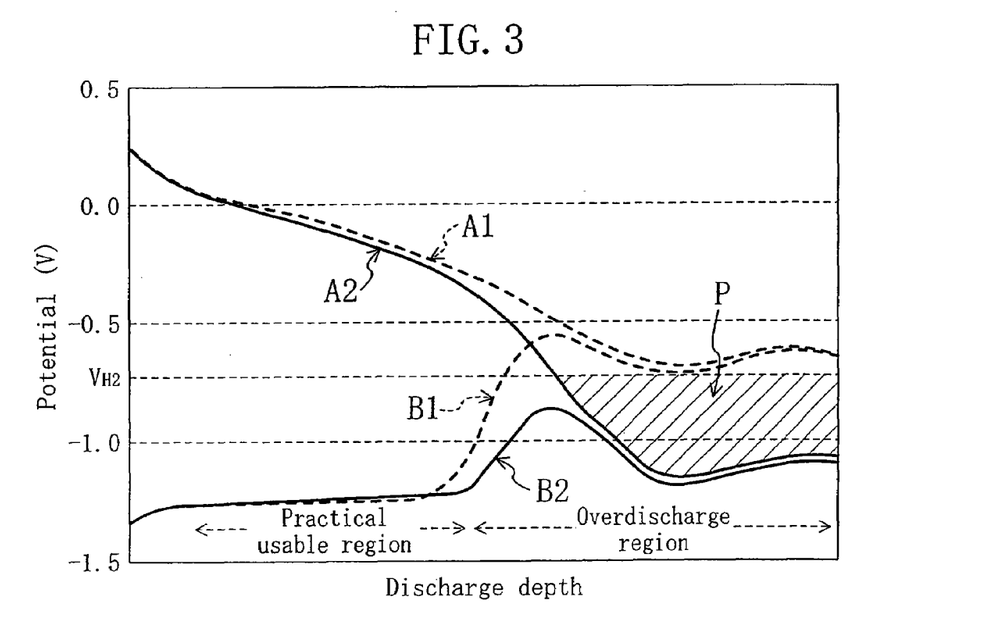
FIG. 3 is a graph showing potential variations of a positive electrode and a negative electrode with respect to discharge depth.

FIG. 3 is a graph showing qualitative variations in potential of the positive electrode and the negative electrode with respect to the discharge depth, wherein the curves indicated by A1 and B1 represent potential variations of the positive electrode and the negative electrode, respectively, in the case where the KOH concentration is low while the curves indicated by A2 and B2 represent potential variations of the positive electrode and the negative electrode, respectively, in the case where the KOH concentration is high.

As shown in FIG. 3, when the discharge reaction progresses to enter into the overdischarge region, zinc passivation occurs in the negative electrode to increase the potential of the negative electrode, which accompanies lowering of the potential of the positive electrode. The increase in the potential of the negative electrode is late in the battery with a high KOH concentration to allow the potential of the positive electrode to be equal to or lower than the hydrogen overvoltage $V_{H2}$ (a region P), thereby promoting hydrogen generation.

On the basis of the above knowledge, various examinations were carried out for finding optimum conditions for the KOH concentration to find that when an electrolyte containing potassium hydroxide at a concentration of 30 to 36%, preferably, 30 to 34% is used, leakage can be prevented effectively in a non-discharging battery and an overdischarging battery.

Embodiment 3

When the volume of a battery is increased by reducing the volume occupied by the sealing unit in the battery for the purpose of increasing the discharge capacity of the battery, the distance between the negative electrode 3 and the gasket 5 is shortened to invite expansion of the negative electrode 3 in overdischarge. This may leads to breakage of a safety valve 5d provided at the gasket to invite leakage of the electrolyte.

In view of the fact that the separator has a function of absorbing expansion of the negative electrode 3, the present inventor examined an optimum range of the film thickness of the separator which can prevent electrolyte leakage even if the volume occupied by the sealing unit is reduced.

The above examination reached a finding that it is preferable to set the film thickness of the separator, namely, the distance in the radial direction between the positive electrode and the negative electrode to be in the range between 0.26 and 0.60 mm.

With the distance smaller than 0.26 mm, the separator does not exert the function of expansion absorption. On the other hand, the distance greater than 0.60 mm increases the internal resistance of the battery to lower the output characteristics of the battery.

Herein, the separator may be any of a non-woven fabric sheet formed by intermingling various kinds of chemical fibers, a porous sheet made of synthetic resin, such as cellophane, polyolefin, or the like, and the like, for example.

Working Examples

Description will be given further below of the constitution and effects of the present invention by referring to working examples, wherein the present invention is not limited to the working examples.

AA (LR6) alkaline batteries as shown in FIG. 1 were prepared by the following steps of <1> to <7>.

<1> Battery Case

A nickel plated steel plate was pressed into the bottomed cylindrical battery case 1 including the opening part 1b with a predetermined thickness and the body part 1a with a predetermined thickness.

<2> Separator

Non-woven fabric with a basic weight of 25 g/m² and a thickness of 0.09 mm, which was obtained by intermingling solvent-spun cellulose fiber and polyvinyl alcohol-based fiber as main components at a weight ratio of 1:1, was wound three times to prepare the bottomed cylindrical separator 3.

<3> Sealing Unit

The gasket 5 was prepared by injection-molding nylon 6.6 as a main component into a predetermined shape with a predetermined dimension. The negative electrode terminal plate 7 was prepared by pressing a nickel plated steel plate into a predetermined shape with a predetermined dimension, and the negative electrode current collector 6 was prepared by performing tin plating on the surface of brass pressed into a nail shape. After the negative electrode current collector 6 was electrically welded to the negative electrode terminal plate 7, the negative electrode current collector 6 is pressed and inserted into a through hole at the center of the gasket 5 to thus obtain the sealing unit 9.

<4> Alkaline Electrolyte

Alkaline electrolyte was prepared which is made of an aqueous solution containing potassium hydroxide and zinc oxide at respective predetermined contents.

<5> Preparation of Positive Electrode

Manganese dioxide powder with a predetermined average particle size and graphite powder were mixed at a predetermined weight ratio, the thus obtained mixture and the alkaline electrolyte were mixed at a weight ratio of 100:1.9. After being subjected to sufficient stirring, the resultant mixture was press-formed into a flake shape. Then, the thus obtained flake-shaped positive electrode mixture was crashed into a granular shape, and was press-formed into a hollowed cylindrical shape to thus obtain a pellet-shaped positive electrode 2.

<6> Preparation of Gelled Negative Electrode

A gelling agent (a thickener of a cross-linked and branched type polyacrylic acid and water absorptive polymer of highly cross-linked and branched type sodium polyacrylate), the alkaline electrolyte, and zinc alloy powder were mixed at a weight ratio of 0.26:0.54:35.2:64.0 to obtain the gelled negative electrode 3. The zinc alloy powder used contains indium of 0.02 weight %, bismuth of 0.01 weight %, and aluminum of 0.005 weight %.

<7> Assembly of Alkaline Battery

The pellet-shaped positive electrode 2 was inserted into the battery case 1, and pressure was applied to the positive electrode 2 by a pressing jig to allow the positive electrode 2 to adhere to the inner wall of the battery case 1. After the separator 4 was placed at the center of the positive electrode 2 adhering to the inner wall of the battery case 1, a predetermined amount of the gelled negative electrode 3 was filled into the separator 4. Then, the opening end of the battery case 1 was crimped and sealed by means of the sealing unit 9, and the outer face of the battery case 1 was covered with a label 8.

(1) Relationship Between Graphite Density and Increased Amount of Maximum Outer Diameter of Battery Prepared batteries of which graphite densities in the positive electrodes are different from each other were allowed to discharge under application of a load of 3.9Ω until it reached 0.9 V, and each increase in maximum outer diameter of the batteries after discharge was measured. The batteries were prepared so as to have a maximum outer diameter of 14.3 mm, which is near the maximum outer diameter (14.5 mm) of the battery provided in JIS. Each battery case was prepared so as to have a thickness at the body part thereof in the range between 0.10 and 0.20 mm.

Each density of graphite in the positive electrodes was measured by the following method.

(i) The volume v1 of the positive electrode was calculated by measuring the outer diameter, the inner diameter, and the height of the positive electrode through X-ray scope of a battery.

(ii) The positive electrode mixture was taken out by breaking down the battery, and the weight w1 thereof was measured.

(iii) Part of the taken-out positive electrode mixture was sampled, and the weight w2 thereof was measured.

(iv) Part of the sampled positive electrode mixture was dissolved with hydrochloric acid and was filtered and dried, and then, the weight w3 of the resultant was measured.

(v) The filtered and dried substance is burnt, and the weight w4 of the ash content of the resultant was measured.

(vi) The content (g) of graphite was obtained with the use of an expression $(w3-w4) \times (w1/w2)$, and the thus obtained solution was divided by the volume v1 of the positive electrode to calculate the density ($g/cm^3$) of the graphite in the positive electrode.

Table 1 indicates the results obtained by measuring each increase in maximum outer diameter of the batteries having graphite densities different from each other.

TABLE 1

| | | Unit | WE1 | WE2 | WE3 | CE1 | WE4 | CE2 | CE3 | CE4 |
|---|---|---|---|---|---|---|---|---|---|---|
| Battery case | Outer diameter | mm | | 14.15 | | | | 14.15 | 13.92 | 13.92 |
| | Thickness of opening part | mm | | 0.18 | | | | 0.18 | 0.20 | 0.20 |
| | Thickness of body part | mm | | 0.10 | | | | 0.17 | 0.20 | 0.20 |
| Thickness of metal jacket | | mm | | 0.05 | | | | 0.05 | 0.10 | 0.10 |
| Maximum outer diameter of battery | | mm | | 14.30 | | | | | 14.22 | |
| Positive electrode | Electrolyte manganese dioxide | Weight ratio | 92.1 | 93.6 | 95.8 | 96.6 | 95.8 | 96.6 | 93.6 | 96.6 |
| | Graphite | Weight ratio | 7.9 | 6.4 | 4.2 | 3.4 | 4.2 | 3.4 | 6.4 | 3.4 |
| | Graphite density in positive electrode | $g/cm^3$ | 0.23 | 0.19 | 0.12 | 0.10 | 0.12 | 0.10 | 0.19 | 0.10 |
| Expansion of positive electrode | Increase in maximum outer diameter of battery | mm | 0.01 | 0.02 | 0.04 | 0.10 | 0.02 | 0.06 | 0.01 | 0.02 |

In the case using a thinned battery case of which body part has a thickness of 0.10 mm, the batteries (Working Examples 1 to 3) of which graphite densities in the positive electrode are in the range between 0.12 and 0.23 $g/cm^3$ exhibited small increases, 0.04 mm or smaller increase, in the maximum outer diameter of the batteries while the battery (Comparative Example 1) of which graphite density is 0.10 $g/cm^3$ exhibited a large increase, 0.10 mm increase, in the maximum outer diameter thereof.

Referring to the case using a battery case of which body part has a thickness of 0.17 mm, similarly, the battery (Working Example 4) of which graphite density in the positive electrode is 0.12 g/cm³ exhibited a small increases, 0.02 mm increase, in the maximum outer diameter of the battery while the battery (Comparative Example 2) of which graphite density is 0.10 gb/cm³ exhibited a large increase, 0.06 mm increase, in the maximum outer diameter thereof.

In the case using a battery case of which body part has a thickness of 0.20 mm, each increase in the maximum outer diameter of the batteries was small, 0.02 or smaller regardless of the graphite density (Comparative Examples 3 and 4).

This proves that: though the outer diameter of a battery of which body part of the battery case has a thickness of 0.17 mm or smaller increases due to expansion of the positive electrode after discharge, such an increase in the outer diameter of the battery can be suppressed by setting the density of graphite in the positive electrode within the range between 0.12 and 0.23 g/cm³.

(2) Relationship Between Thickness Ratio Between Positive Electrode and Negative Electrode and Discharge Characteristics The discharge characteristics of batteries prepared so as to have different ratios between the thickness in the radial direction of the positive electrode and that of the negative electrode changed were evaluated.

coordinates thereof. In the present invention, SMX-225 CTSV produced by SHIMADZU CORPORATION was used.

Evaluation of the discharge characteristics were carried out according to the following low-rate and high-rate discharges adhering to IEC.

(i) Low-rate discharge: discharge that satisfies, where a cycle of discharge for four hours a day with a load of 43Ω applied is repeated everyday under an environment at a temperature of 20±2° C., discharge characteristics that a discharge duration accumulated until it reaches 0.9 V exceeds 100 hours.

(ii) High-rate discharge: discharge that satisfies, where pulse discharge in which a cycle of discharge at 1.5 W for two seconds and discharge at 0.65 W for 28 seconds is repeated is repeated ten cycles per one hour under an environment at a temperature of 20±2° C., discharge characteristics that the number of the cycles accumulated until it reaches 1.05 V exceeds 130.

Table 2 indicates the measurement results of low-rate discharge characteristics and high-rate discharge characteristics of the batteries having the thickness ratios between the positive electrode and the negative electrode different from each other.

TABLE 2

| | | Unit | WE5 | WE6 | WE7 | WE8 | WE9 | WE10 | WE11 |
|---|---|---|---|---|---|---|---|---|---|
| Battery case | Thickness of opening part | mm | | | | 0.18 | | | |
| | Thickness of body part | mm | | | | 0.15 | | | |
| Graphite density (in positive electrode) | | g/cm³ | 0.19 | 0.19 | 0.19 | 0.19 | 0.19 | 0.19 | 0.19 |
| Thickness of positive electrode | | mm | 2.34 | 2.39 | 2.44 | 2.49 | 2.55 | 2.60 | 2.65 |
| Loading weight of positive electrode | | g | 10.96 | 11.16 | 11.38 | 11.58 | 11.78 | 11.98 | 12.18 |
| Thickness of negative electrode | | mm | 3.74 | 3.69 | 3.63 | 3.58 | 3.53 | 3.47 | 3.42 |
| Loading weight of negative electrode | | g | 6.70 | 6.54 | 6.36 | 6.20 | 6.07 | 5.92 | 5.76 |
| Thickness ratio | | | 0.63 | 0.65 | 0.67 | 0.70 | 0.72 | 0.75 | 0.77 |
| (positive electrode/negative electrode) | | | | | | | | | |
| Increase in maximum outer diameter of battery | | mm | 0.01 | 0.01 | 0.02 | 0.02 | 0.03 | 0.02 | 0.03 |
| Discharge performance | Low rate | hr. | 95.9 | 98.1 | 100.2 | 102.1 | 103.9 | 105.6 | 107.4 |
| (adhering to IEC) | High rage | cycles | 157 | 163 | 151 | 142 | 135 | 127 | 102 |

Batteries exhibiting no increase in the outer diameter of the battery after discharge were prepared by setting the thickness of the body part of the body case to be 0.15 mm and the density of graphite in the positive electrode to be 0.19 g/cm³.

The thickness of the positive electrode was obtained by subtracting the inner diameter of the positive electrode from the inner diameter of the battery case (the outer diameter of the positive electrode). The thickness of the negative electrode was obtained by subtracting the outer diameter of the negative electrode current collector from the outer diameter of the negative electrode.

The outer diameter and the inner diameter of the positive electrode and the outer diameter of the negative electrode can be measured by, for example, CT-scanning the body part of the battery. In an image of a transverse section of the body part of a battery obtained by CT scanning, arbitrary five virtual points are determined at substantially regular intervals on a to-be-measured part, and then, the diameter of the to-be-measured part is calculated by a least square method using the It is understood that the batteries having thickness ratios of the positive electrode to the negative electrode in the range between 0.63 and 0.72 (Working Examples 5 to 9) are excellent in high-rate discharge characteristics while the batteries having thickness ratios of the positive electrode to the negative electrode in the range between 0.67 and 0.77 (Working Examples 7 to 11) are excellent in low-rate discharge characteristics.

(3) Relationship Between Particle Size of Manganese Dioxide and Discharge Characteristics The discharge characteristics of prepared batteries having particle size distributions of manganese dioxide different from each other were evaluated.

The batteries exhibiting no increase in outer diameter of the battery after discharge were prepared by setting the thickness of the body part of the battery case to be 0.15 mm and the density of graphite in the positive electrode to be 0.19 g/cm³.

The volume average particle size of manganese dioxide used was set in the range between 30 and 50 μm.

The particle size distribution was measured by HELOS & RODOS produced by Sympatec GmbH with the distribution pressure set at 3.0 bar and the range used set at R4.

Table 3 indicates the measurement results of the low-rate and high-rate discharge characteristics of the batteries having particle size distributions of manganese dioxide different from each other.

in the high rate discharge characteristics of the above described battery (approximately 10% enhancement).

Accordingly, it is understood that setting the ratio of manganese dioxide of which particle size is 5 μm or smaller to be 8% or lower or setting the ratio of that of which particle size is 100 μm or greater to be 5% or lower attains excellent discharge characteristics.

TABLE 3

|  |  | unit | WE12 | WE13 | WE14 | WE15 | WE16 | WE17 |
|---|---|---|---|---|---|---|---|---|
| Battery case | Thickness of opening part | mm |  |  | 0.18 |  |  |  |
|  | Thickness of body part | mm |  |  | 0.15 |  |  |  |
| Electrolyte | Volume average particle size | μm | 34 | 37 | 33 | 34 | 34 | 35 |
| manganese | Rate of not exceeding 5 μm | wt % | 11.8 | 8.0 | 12.2 | 8.0 | 11.8 | 8.0 |
| dioxide | Rate of exceeding 100 μm | wt % | 9.1 | 9.5 | 5.0 | 5.0 | 9.1 | 5.0 |
| Graphite density (in positive electrode) |  | g/cm³ | 0.19 | 0.19 | 0.19 | 0.19 | 0.19 | 0.19 |
| Loading weight of positive electrode |  | g |  |  | 11.58 |  |  | 12.18 |
| Loading weight of negative electrode |  | g |  |  | 6.20 |  |  | 5.76 |
| Thickness ratio (positive electrode/negative electrode) |  |  |  |  | 0.70 |  |  | 0.77 |
| Discharge performance | Low rate | hr. | 102.1 | 102.3 | 102.2 | 102.3 | 107.4 | 107.6 |
| (adhering to IEC) | High rate | cycles | 142 | 148 | 150 | 152 | 102 | 113 |

Table 3 proves that the battery having a thickness ratio of the positive electrode to the negative electrode of 0.70 (Working Examples 12 to 15) are excellent in high-rate discharge characteristics, wherein the batteries containing not exceeding 8% manganese dioxide of which particle size is 5 μm or smaller (Working Examples 13 and 15) have further excellent high-rate discharge characteristics. This might be because: fine particles of which particle size is 5 μm or smaller are liable to cohere as a single element of manganese dioxide without coming in contact with graphite in the positive electrode to serve as a factor of increasing the electric resistance.

It is additionally understood that the batteries containing not exceeding 5% manganese dioxide of which particle size is 100 μm or greater (Working Examples 14 and 15) have further excellent high-rate discharge characteristics. This might be because: in the discharge reaction of manganese dioxide, proton received at the surface of the manganese dioxide from water is reduced from tetrad to triad to be diffused inside the particles, thereby homogenizing the manganese dioxide; nevertheless, the proton are hardly diffused and hardly reach the inside of the particles having a diameter of 100 μm or greater to serve as a factor of enhancing the polarization.

Table 3 further proves that the batteries having a thickness ratio of the positive electrode to the negative electrode of 0.77 (Working Examples 16 and 17) are excellent in low-rate discharge characteristics, of which enhancement is over that (4) Relationship Between KOH Concentration and Leakage Resistance The leakage resistance of prepared batteries having concentrations of potassium hydroxide in the alkaline electrolyte different from each other was evaluated.

Batteries exhibiting no increase in outer diameter of the battery after discharge were prepared by setting the thickness of the body part of the battery case to be 0.15 nm and the density of graphite in the positive electrode to be 0.19 g/cm³. Each gasket was made of a material of which main component is polyamide resin.

The KOH concentration was measured by the following method.

(i) The gelled negative electrode was taken out by braking down a battery, and the electrolyte thereof is separated by a centrifugal to extract part of the electrolyte. Then, the weight thereof is measured.

(ii) The thus extracted electrolyte is diluted with water, and the weight w2 of KOH is measured by neutralization titration using hydrochloric acid.

(iii) The KOH concentration (%) is calculated with the use of an expression (w2/w1)×100.

Table 4 shows the results obtained by evaluating the leakage resistance of the batteries having KOH concentrations different from each other.

TABLE 4

|  |  | unit | WE18 | WE19 | WE20 | WE21 |
|---|---|---|---|---|---|---|
| Battery case | Thickness of opening part | mm |  | 0.18 |  |  |
|  | Thickness of body part | mm |  | 0.15 |  |  |
| Alkaline electrolyte | KOH | wt % | 32.0 | 35.5 | 37.5 | 39.5 |
|  | ZnO | wt % |  | 2.0 |  |  |
|  | H₂O | wt % | 66.0 | 62.5 | 60.5 | 58.5 |
|  | KOH concentration | % | 30.2 | 33.7 | 35.8 | 37.6 |
| Graphite density (in positive electrode) |  | g/cm³ | 0.19 | 0.19 | 0.19 | 0.19 |
| Leakage occurrence in non-discharging battery (80° C.) | One month | Occurrence | 0 | 0 | 0 | 0 |
|  | Two months | Occurrence | 0 | 0 | 0 | 0 |
|  | Three months | Occurrence | 0 | 0 | 0 | 3 |
| Leakage occurrence in overdischarging battery (normal temperature) | One month | Occurrence | 0 | 0 | 0 | 0 |
|  | Two months | Occurrence | 0 | 0 | 1 | 3 |
|  | Three months | Occurrence | 0 | 0 | 2 | 7 |

The leakage resistance of non-discharging batteries was evaluated according to the number of batteries in which leakage occurs out of 20 batteries after one-month to three-month standing at 80° C. The leakage resistance of overdischarging batteries was evaluated according to the number of batteries in which leakage occurs out of 20 batteries after one-month to three-month discharge under application of a load of 3.9Ω at normal temperature.

No leakage was observed in any of non-discharging batteries of which KOH concentrations are set in the range between 30 and 36% (Working Examples 18 to 20). Further, no leakage was observed in any of overdischarging batteries of which KOH concentrations are set in the range between 30 and 34% (Working Examples 18 and 19).

These results prove that with the use of an alkaline electrolyte containing KOH of which concentration is set in the range between 30 and 36%, more preferably, between 30 and 34%, leakage can be prevented in a non-discharge battery and an overdischarge battery.

(5) Relationship Between Distance Between Positive Electrode and Negative Electrode and Leakage Resistance The leakage resistance of batteries was evaluated with the use of batteries in which the distances in the radial direction between the positive electrode and the negative electrode are different from each other.

Batteries exhibiting no increase in outer diameter of the battery after discharge were prepared by setting the thickness of the body part of the battery case to be 0.15 mm and the density of graphite in the positive electrode to be 0.19 g/cm$^3$.

The distance between the positive electrode and the negative electrode was changed by changing the thickness of the separator in such a manner that a non-woven sheet with a thickness of 0.09 mm was wound one to three times.

The leakage resistance of non-discharging batteries and overdischarging batteries was evaluated in the same manner as in the above description (4).

Table 5 indicates the results obtained by evaluating the leakage resistance of the batteries in which the distances between the positive electrode and the negative electrode are different from each other.

TABLE 5

|  |  | unit | WE22 | WE23 | WE24 |
|---|---|---|---|---|---|
| Battery case | Thickness of opening part | mm |  | 0.18 |  |
|  | Thickness of body part | mm |  | 0.15 |  |
| Graphite density (in positive electrode) |  | g/cm$^3$ | 0.19 | 0.19 | 0.19 |
| Distance between electrodes |  | mm | 0.41 | 0.26 | 0.17 |
| Leakage occurrence in | One month | Occurrence | 0 | 0 | 0 |
| non-discharging battery | Two months | Occurrence | 0 | 0 | 0 |
| (80° C.) | Three months | Occurrence | 0 | 0 | 0 |
| Leakage occurrence in | One month | Occurrence | 0 | 0 | 0 |
| overdischarging battery | Two months | Occurrence | 0 | 0 | 2 |
| (normal temperature) | Three months | Occurrence | 0 | 0 | 4 |

No leakage was observed in non-discharging batteries in which the distances between the positive electrode and the negative electrode are set in the range between 0.17 and 0.41 mm (Working Examples 22 to 24). Further, no leakage was observed in overdischarging batteries in which the distances between the positive electrode and the negative electrode are set in the range between 0.26 and 0.41 mm (Working Examples 22 and 23).

This proves that setting the distance between the positive electrode and the negative electrode to be in the range between 0.17 and 0.41, more preferably, between 0.26 and 0.41 mm prevents leakage occurrence in a non-discharging battery and an overdischarging battery.

Heretofore, the present invention has been described with reference to the preferred embodiments, but the above description does not limit the present invention and various modifications are possible.

What is claimed is:

1. An AA alkaline battery comprising: a bottomed cylindrical battery case including a body part and an opening part sealed by means of a gasket; and a positive electrode and a negative electrode accommodated in the battery case with a separator interposed therebetween, wherein the AA alkaline battery has an outer diameter in a range between 14.1 and 14.3 mm, the body part of the battery case has a thickness in a range between 0.1 and 0.17 mm, and the positive electrode is made of a material obtained by adding graphite to manganese dioxide, a density of the graphite in the material of the positive electrode being in a range between 0.12 and 0.23 g/cm$^3$.

2. The AA alkaline battery of claim 1, wherein the density of the graphite is in a range between 0.16 and 0.20 g/cm$^3$.

3. The AA alkaline battery of claim 1, wherein the thickness of the body part of the battery case is smaller than that of the opening part of the battery case.

4. The AA alkaline battery of claim 3, wherein the thickness of the body part of the battery case is 15% or more smaller than that of the opening part of the battery case.

5. The AA alkaline battery of claim 1, wherein the body part of the battery case has an outer diameter in a range between 13.95 and 14.15 mm.

6. The AA alkaline battery of claim 1, wherein the positive electrode, which is in a hollowed cylindrical shape, and the negative electrode, which is gelled and filled in a hollowed part of the positive electrode, are disposed in the battery case with the separator, which is in a bottomed cylindrical shape, interposed therebetween, and a ratio ($T_1/T_2$) of a thickness ($T_1$) in a radial direction of the positive electrode to a thickness ($T_2$) in a radial direction of the negative electrode is in a range between 0.63 and 0.72, and the AA alkaline battery being capable of high-rate discharge that the number of cycles accumulated until it reaches 1.05 V exceeds 130 where pulse discharge in which a cycle of discharge at 1.5 W for two seconds and discharge at 0.65 W for 28 seconds is repeated is repeated ten cycles per one hour under an environment at a temperature of 20±2° C.

7. The AA alkaline battery of claim 1, wherein the positive electrode, which is in a hollowed cylindrical shape, and the negative electrode, which is gelled and filled in a hollowed part of the positive electrode, are disposed in the battery case with the separator, which is in a bottomed cylindrical shape, interposed therebetween, and a ratio ($T_1/T_2$) of a thickness ($T_1$) in a radial direction of the positive electrode to a thickness ($T_2$) in a radial direction of the negative electrode is in a range between 0.67 and 0.77, and the AA alkaline battery being capable of low-rate discharge that a discharge duration accumulated until it reaches 0.9 V exceeds 100 hours where a cycle of discharge for four hours a day with a load of 43Ω applied is repeated everyday under an environment at a temperature of 20±2° C.

8. The AA alkaline battery of claim 6, wherein the manganese dioxide has a volume average particle size in a range between 30 and 50 μm and includes 5% or lower particles of which particle size is equal to or smaller than 100 μm.

9. The AA alkaline battery of claim 6, wherein the manganese dioxide has a volume average particle size in a range between 30 and 50 μm and includes 8% or lower particles of which particle size is equal to or smaller than 5 μm.

10. The AA alkaline battery of claim 1, wherein an electrolyte is filled in the battery case, the electrolyte being made of an aqueous solution containing potassium hydroxide at a concentration in a range between 30 and 36%.

11. The AA alkaline battery of claim 10, wherein the electrolyte is made of an aqueous solution of potassium hydroxide at a concentration in a range between 30 and 34%.

12. The AA alkaline battery of claim 10, wherein the gasket is made of a material of which main component is polyamide resin.

13. The AA alkaline battery of claim 1, wherein the positive electrode, which is in a hollowed cylindrical shape, and the negative electrode, which is gelled and filled in a hollowed part of the positive electrode, are disposed in the battery case with the separator, which is in a bottomed cylindrical shape, interposed therebetween, and a distance in a radial direction between the positive electrode and the negative electrode is in a range between 0.26 and 0.60 mm.

14. The AA alkaline battery of claim 1, wherein the battery case has an outer diameter of which increase after discharge under application of a load of 3.9Ω at a temperature of 20° C. until it reaches 0.9 V is equal to or smaller than 0.05 mm.

* * * * *